Aug. 16, 1966 R. T. MOORE, JR 3,267,482
DRIVER CIRCUIT FOR MAGNETIC RECORDING HEADS
Filed Jan. 22, 1962
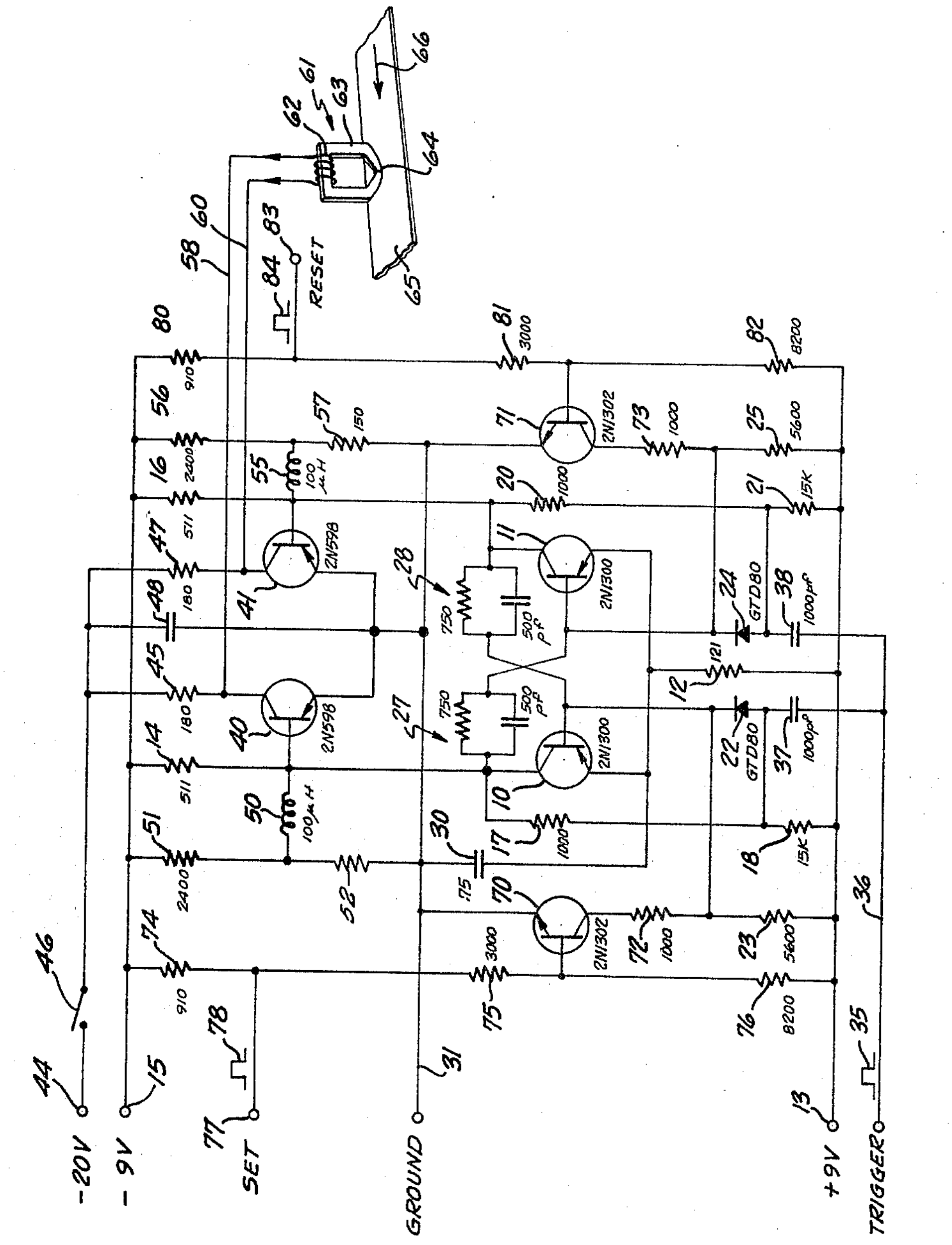
RAY T. MOORE, JR.
INVENTOR.
BY Nathan N. Kallman
ATTORNEY 3,267,482

DRIVER CIRCUIT FOR MAGNETIC RECORDING HEADS

Ray T. Moore, Jr., Palo Alto, Calif., assignor to Ampex Corporation, Redwood City, Calif., a corporation of California Filed Jan. 22, 1962, Ser. No. 167,787
8 Claims. (Cl. 346—74)

This invention relates generally to magnetic recording systems and particularly to a circuit for driving a magnetic transducting unit to record non-return-to-zero signals on a magnetic storage medium.

The non-return-to-zero method of recording information on magnetic tapes, disks or drums is well known for use in connection with electronic data processors. In this method, recording is achieved by rapid changes in the state of magnetization of the magnetic medium as a result of saturation of the medium by signals derived from the magnetic transducing unit. Information is represented by the presence or absence of these changes.

Many circuits are known for driving a recording head to record information on a moving magnetic storage medium in accordance with the non-return-to-zero (NRZ) method. However, it is very desirable to provide a circuit which is simple and inexpensive and is capable of driving the digital recording head with current having a reasonably fast rise time. Furthermore, the current waveform generated by the driving circuit should be predictable, symmetrical, properly shaped, and independent of circuit parameter variations.

It is, accordingly, an object of the present invention to provide a driver circuit which is relatively inexpensive and reliable and provides a driving current which has symmetrical and controllable characteristics for recording in accordance with the NRZ method.

Another object of the present invention is to provide a circuit of the type referred to which includes transistors and solid-state diodes and which may be triggered, set or reset from one stable state to another.

A further object of the invention is to provide a driver circuit for recording NRZ information on a magnetic medium by a recording head where the current flowing through the head may be stopped at any time without disturbing or altering the stable state of the circuit.

In accordance with the present invention there is provided a circuit for driving the coil of a magnetic recording transducer to record non-return-to-zero information on a magnetic medium movable with respect to the transducer. The circuit includes two drive transistors, each having a control electrode for controlling the current flow through the other two electrodes of the drive transistor. Two resistance elements are connected each in series with the same voltage source and the other two electrodes of each of the drive transistors. The coil is connected between the junction of each of the resistance elements and its associated drive transistor. As a result the direction of current flow through the coil reverses whenever the cutoff transistor is rendered conducting while the conducting transistor is simultaneously cut off. Preferably the drive transistors are alternately rendered conducting and non-conducting by the provision of a transistor flip-flop directly connected to the drive transistors.

These and further objects of the present invention will be better understood by reference to the following description, taken in connection with the accompanying drawing, the single figure of which is a circuit diagram of a driver circuit for a magnetic recording head in accordance with the present invention.

Referring now to the drawing, there is illustrated a driver circuit embodying the present invention and including a bistable circuit or a flip-flop. The flip-flop includes two junction transistors 10 and 11 which, as shown by their symbols, are P-N-P junction transistors. The two emitters of the transistors 10 and 11 are tied together and connected by a resistor 12 to a positive voltage source 13. The collector of the first transistor 10 is connected through a resistor 14 to a negative voltage source 15. Similarly the collector of the second transistor 11 is connected to the negative voltage source 15 through a resistor 16. Furthermore, the collector of the first transistor 10 is connected through resistors 17 and 18 to the positive voltage source 13 while the collector of the second transistor 11 is also connected to the voltage source 13 through resistors 20 and 21. The base of the first transistor 10 is connected to the positive voltage source 13 through a crystal diode 22 having its cathode connected to the base and its anode to the junction between the resistors 17 and 18 and hence to source 13. Also, the base of the first transistor 10 is directly connected to source 13 through a resistor 23. In a similar manner, the base of the second transistor 11 is connected to the voltage source 13 through a diode 24 having its cathode connected to the base and its anode to the junction between the resistors 20 and 21 and hence to source 13. Also the base of the second transistor 11 is directly connected to source 13 through resistor 25.

A conventional cross-coupling is provided between the base of each transistor and the collector of the other transistor in order for the circuit to operate as a flip-flop having two stable states. Thus coupling network 27 connects the base of the second transistor 11 to the collector of transistor 10 while coupling network 28 couples the base of transistor 10 to the collector of transistor 11. Each of the coupling networks 27, 28 includes a resistor and a capacitor connected in parallel. The purpose of the capacitor included in each of the coupling networks is to speed up the transition from one stable state to the other. A filter or bypass capacitor 30 is connected between the two emitters and ground represented by lead 31 and tends to hold the emitters at their mean voltage while the flip-flop changes states.

With this arrangement, one of the transistors 10, 11 conducts while the other is cut off in a chosen one of the stable states. In the other stable state, these conditions are reversed.

To reverse states, a positive trigger pulse indicated at 35 is applied by a trigger input lead 36 through capacitors 37 and 38 to the diodes 22 and 24 which are coupled to the transistors 10, 11. The biases on the diodes 22, 24 are determined by the then-existing state of the flip-flop circuit so that, as described in detail below, the diodes 22, 24 provide a pulse gating function in applying the trigger pulse to the proper base. It will be understood that the trigger pulse 35 represents the digital information to be recorded by the NRZ method.

Two driver transistors 40 and 41 are associated with and controlled by the flip-flop circuit including the transsistors 10 and 11. The transistors 40 and 41 are P-N-P junction transistors like transistors 10 and 11, although the latter preferably have a faster switching characteristic. The emitters of the transistors 40 and 41 are connected to the common ground lead 31. The collector of the transistor 40 is connected to a negative voltage source 44 through a resistor 45. A switch 46 may be provided between the source 44 and the resistor 45, this switch 46 being closed to permit head current to flow. The collector of the transistor 41 is also connected to the source 44 through a resistor 47. A filter capacitor 48 may be connected between the source 44 and ground to prevent rapid voltage variations between the source and ground.

The base of the transistor 40 is directly connected to the collector of the transistor 10. Similarly the base of the transistor 41 is directly connected to the collector of the transistor 11. Furthermore, the base of the transistor 40 is connected to one terminal of an inductor 50, the other terminal of which is connected to the junction point of two resistors 51, 52 which are in turn connected between the voltage source 15 and ground and from a voltage divider. In a similar manner the base of the transistor 41 is connected to one terminal of an inductor 55 which is also connected to the junction between two resistors 56 and 57 which form a voltage divider between the voltage source 15 and ground.

A lead 58 is connected to the junction between the resistor 45 and the collector of the transistor 40 while a lead 60 is similarly connected to the junction between the resistor 47 and the collector of the transistor 41. The two leads 58, 60 form the output circuit connection to a recording or write head indicated at 61. The write head 61 has a driver coil 62 to which the output leads 58, 60 are connected. The driver coil 62 energizes the magnetic head 63. The head 63 has an air gap 64 across which a fringing magnetic field is developed when current flows through the driver coil 62 in one direction or in the other. A magnetic recording medium 65 moves longitudinally, as shown by the arrow 66, past the air gap 64 within the fringing magnetic field at the gap 64. The magnetic medium may consist of a magnetic tape, magnetic disk, drum or the like, as is conventional.

In order to set or reset the driving circuit of the invention there is provided a pair of set and reset transistors 70 and 71. The transistors 70 and 71 are N-P-N junction transistors as indicated by their symbols. The emitters of the two transistors 70 and 71 are both directly connected to the ground lead 31. The collector of the set transistor 70 is connected to the base of the transistor 10 through a resistor 72. Similarly the collector of the reset transistor 71 is connected to the base of the transistor 11 through a resistor 73.

A voltage divider network is connected between the negative voltage source 15 and the positive voltage source 13. This voltage divider network consists of three resistors 74, 75 and 76 connected in series. The base of the set transistor 70 is connected to the junction of the resistors 75 and 76 while the set input terminal 77 is connected to the junction of the resistor 74 and 75. A positive set pulse is indicated at 78. Similarly, a voltage divider connected between the sources 15 and 13 is provided for the reset transistor 71. This voltage divider consists of the resistors 80, 81 and 82 connected in series. The junction between the resistors 81, 82 is connected to the base of the reset transistor 71. The reset input terminal 83 is connected to the junction between the resistors 80 and 81. A positive reset pulse is indicated at 84.

It will be understood that all P-N-P transistors may be replaced by N-P-N transistors and vice versa provided that the voltage of voltage sources 13, 15 and 44 is reversed. In that case the polarity of the trigger, set and reset pulses should be reversed as well as the polarity of the two diodes 22 and 24.

The operation of the circuit of the invention will now be explained. It should first be noted for future reference that a P-N-P transistor such as transistor 10 is rendered conductive when current is directed out of its base while an N-P-N transistor is rendered conductive when current is directed into its base. Thus, the P-N-P type conducts when its emitter is positive with respect to its base and an N-P-N transistor, such as transistor 70, conducts when the base is rendered positive with respect to its emitter.

The values or circuit parameters of the resistors, capacitors and inductors are indicated by way of example in the drawing as well as the types of the transistors and diodes. It is to be noted that the resistances are given in ohms unless otherwise indicated and the capacitances are shown in microfarads unless otherwise indicated.

Let it now be assumed that the flip-flop circuit is in the stable condition in which the first transistor 10 is conducting while the second transistor 11 is non-conducting. The manner in which one transistor is rendered conducting while the other transistor is rendered non-conducting will be explained hereinafter. Because transistor 10 is assumed to be conducting, its collector voltage is positive and a large current flows from the collector of the transistor 10 through the inductor 50 and the resistor 52 to ground.

The collector voltage is impressed through coupling network 27 upon the base of the transistor 11 thus maintaining the transistor 11 in the "OFF" condition. In turn, the voltage of the collector of the second transistor 11 is impressed by the network 28 to maintain the transistor 10 conductive. The flip-flop will remain in this state until set, reset or triggered by an input pulse. Alternatively the negative charge on the capacitor of the coupling network 28 will eventually leak off through the resistor 18 or the resistor 23 in about 3 microseconds with the circuit values shown.

In accordance with the present invention the two drive transistors 40 and 41 are controlled by the flip-flop and control, in turn, the direction of current flow through the driving coil 62 of the write head.

When the transistor 10 is conducting the base of the drive transistor 40 is positive with respect to its grounded emitter, and the drive transistor 40 is cut off. Further, the positive potential at the collector of the transistor 10 establishes a steady state current flow through the inductor 50.

At the same time the more negative potential at the collector of the nonconducting transistor 11 maintains the base of the transistor 41 at a potential such that the drive transistor 41 is conducting. In this condition a current from ground through the transistor 41, the drive head coil 62, and the resistor 45 flows to the source 44. It is to be noted that the conductive condition of the transistor 41 maintains its base at substantially ground so that very little steady-state current flows in the inductor 55.

Let it be assumed, however, that a positive trigger pulse 35 is applied to the input lead 36. The coupling between the transistors 10, 11 and the diodes 22, 24 provides a pulse gating which insures reversal of the state of the flip-flop. With the first transistor 10 conducting, the first diode 22 is forward biased. Conversely, the second diode 24 is reverse biased. Thus, the trigger pulse is applied only to the base of the first transistor 10, driving this base positive relative to the emitter and terminating conduction.

As the transistor 10 ceases conducting, its collector becomes more negative. This negative voltage change is impressed through the coupling network 27 to the base of the transistor 11, driving the base negative relative to the emitter to direct current out of the base so as to render transistor 11 conductive.

As the transistor 11 begins to conduct, its collector becomes more positive. This positive voltage excursion is impressed through the coupling network 28 on the base of the transistor 10, thus speeding up the switching to the other stable condition. The second transistor 11 remains conductive until the arrival of the next trigger pulse 35, which is gated by the diodes 22, 24 to the base of transistor 11. Thereupon, the cycle of operation reverses and transistor 10 becomes conductive again and transistor 11 nonconductive. It will be noted that the two emitters are tied together and maintained at the same potential. Thus the two transistors 10 and 11 are essentially controlled by their base voltages which, in turn, are controlled by the voltages at the collectors of the opposite transistor.

As the flip-flop is triggered so that transistor 11 becomes conducting while transistor 10 is cut off, the current supply to the inductor 50 through the transistor 10 is cut off. The inductive inertia of the inductor 50 attempts to maintain the former current by drawing current out of the base of the transistor 40 and turning it on in an extremely rapid fashion. Coincidentally, the conduction of the transistor 11 and the concomitant rise in potential at the collector of the transistor 11 supply current from the effective voltage source of the capacitor 30 of a sense such as to accomplish an extremely rapid "sweep-out" of minority carriers in the base of the transistor 41, snapping that transistor 41 off.

The current through the drive coil 62 reverses with the conduction change and flows to the source 44 via the transistor 40, the drive coil 62, the resistor 47 and switch 46. The switching of the drive transistors 40 and 41 is speeded by the arrangement of this invention so that the rise time of the current through the drive coil 62 is independent of the parameters of the drive circuitry and depends only on the values of the resistors 45 and 47 and the coil 62.

Setting or resetting of the flip-flop is accomplished as follows. Normally the base of the transistor 70 is maintained at a negative potential because the resistance of the resistor 76 is larger than that of the resistors 74 and 75 which are all connected between the negative source 15 and the positive source 13. Because the emitter of the transistor 70 is maintained at ground potential the conduction of the transistor 70 is controlled by its base potential. Accordingly a positive set pulse 78 applied to terminal 77 will render the base of transistor 70 positive and the transistor will conduct to provide a low impedance path to ground for current from the base of transistor 10 thus rendering the transistor 10 conducting if it was previously cut off. If the transistor 10 already is conducting, the set pulse 78 has no effect on the state of the flip-flop.

Similarly, application of a reset pulse 84 will cause conduction of transistor 11 if it was previously cut off. Otherwise the reset pulse has no effect.

Thus it will be seen that the circuit of this invention has a rise time and waveform of drive current that are determined by the resistance of resistors 45 and 47 and by the inductance of drive coil 62. The drive transistors 40 and 41 are switched in a much shorter time than the rise time of the drive current, and therefore variations in circuit parameters will not influence the performance of the circuit. The circuit operates symmetrically, in that positive-going and negative-going changes in the recorded signal are alike.

There has thus been disclosed a simple and inexpensive circuit for driving a digital write head to record NRZ information. The current rise time is fast and the waveform is predictable and independent of circuit parameter variations. It will also be evident that opening of switch 46 will interrupt the current through the driver coil 62 but will not disturb the operation of the flip-flop. Current conduction through the drive coil 62 will stop with the opening of the switch. However, when the switch is closed again, the proper transistor will conduct drive current through the drive coil 62 in the proper direction. As explained, the state of the flip-flop may be changed by a trigger signal or by a set or reset pulse.

What is claimed is:

1. A circuit for driving a magnetic head for non-return-to-zero recording, including
 a magnetic head energizing circuit,
 a pair of drive transistors, each having a control electrode for controlling current flow through input and output electrodes thereof, output circuits coupled to said output electrodes of said drive transistors,
 means coupling the output circuits of the drive transistors in series with the energizing circuit,
 a source of relatively fixed potential,
 a pair of inductors respectively coupled between the control electrodes of the drive transistors and said source of relatively fixed potential,
 a flip-flop circuit coupled to the control electrodes of the drive transistors,
 and means for applying trigger pulses to the flip-flop circuit.

2. In magnetic recording apparatus for recording non-return-to-zero information and including a magnetic write head having a coil,
 a circuit for driving the coil comprising a first and second drive transistor, each having a control electrode for controlling current flow through the other two electrodes thereof,
 means for alternatively rendering one of the drive transistors conducting and the other one non-conducting,
 a first and second impedance element,
 a first voltage source, the first voltage source being serially connected with the first impedance element and the other electrodes of the first transistor and being serially connected with the second impedance element and the other electrodes of the second transistor,
 the coil being connected between the junction of the first transistor and the junction of the second impedance element and said second transistor, whereby the direction of current flow through the coil is dependent upon whether the first or the second transistor conducts while the other one of the drive transistors is cut off,
 a first and a second inductor,
 and a source of relatively fixed potential,
 each of the inductors being connected between one of the control electrodes and the source of relatively fixed potential,
 whereby the flow of current through the inductors is maintained whenever one of the drive transistors is switched from the conducting to the non-conducting state while the other drive transistor is switched from the non-conducting to the conducting state.

3. In a magnetic recording apparatus for recording non-return-to-zero information and including a magnetic write head having a coil,
 a circuit for driving the coil comprising a flip-flop having first and second transistors, each having an emitter, collector and base electrode,
 third and fourth drive transistors, each having a control electrode for controlling current flow through the other two electrodes thereof,
 the collector of the first transistor being directly connected to the control electrode of the third transistor, the collector of the second transistor being directly connected to the control electrode of the fourth transistor,
 first and second impedance elements,
 a first voltage source, the voltage source being serially connected with the first impedance element and the other electrodes of the third transistor and being serially connected with the second impedance element and the other electrodes of the fourth transistor,
 the coil being connected between the junction of the first impedance element and the third transistor and the junction of the second impedance element and the fourth transistor, whereby the direction of current flow through the coil is dependent upon whether the third or the fourth transistor conducts while the other one of the drive transistors is cut off,
 first and second inductors,
 and a source of relatively fixed potential,
 each of the inductors being connected between a different one of the control electrodes of the third and fourth transistors and the source of potential,
 whereby the flow of current through the inductors is maintained for a period whenever the flip-flop changes state to speed up the switching of the flip-flop and the switching of the drive transistors from the conducting to the non-conducting state.

4. A circuit for driving a magnetic write head having a coil to record non-return-to-zero information on a magnetic medium movable with respect to the head, the circuit comprising:

a transistor flip-flop having first and second transistors each having emitter, collector and base electrodes, third and fourth drive transistors, each having emitter, collector and base electrodes, the collector of the first transistors being directly connected to the base of the third transistor to provide a first junction, the collector of the second transistor being directly connected to the base of the fourth transistor to provide a second junction, a source of voltage, first and second impedance elements, means connecting the voltage source in series with the first impedance element and the emitter and collector electrodes of the third transistor and connecting the source in series with the second impedance element and the emitter and collector electrodes of the fourth transistor, the coil being connected between the junction of the first impedance element and the third transistor and the junction of the second impedance element and the fourth transistor, whereby the direction of current flow through the coil reverses when one of the drive transistors becomes conducting while the other is cut off, first and second inductors, one end of each of the inductors being directly connected to one of the first and second junctions, whereby the flow of current through the inductors is maintained upon the flip-flop changing state to speed up the switching of the flip-flop and to rapidly reverse the direction of current flow through the coil.

5. A circuit for driving a magnetic write head having a coil to record non-return-to-zero information on a magnetic medium movable with respect to the head, the circuit comprising:

a transistor flip-flop having first and second transistors, each having emitter, collector and base electrodes, third and fourth drive transistors, each having emitter, collector and base electrodes, the collector of the first transistor being directly connected to the base of the third transistor to provide a first junction, the collector of the second transistor being directly connected to the base of the fourth transistor to provide a second junction, a source of voltage, first and second resistors, means connecting the source in series with the first resistor and the emitter and collector electrodes of the third transistor and connecting the source in series with the second resistor and the emitter and collector electrodes of the fourth transistor, the coil being connected between the junction of said first resistor and the third transistor and the junction of the second resistor and the fourth transistor, first and second inductors, one end of each of the inductors being directly connected to one of the first and second junctions, and means including a voltage divider having an intermediate point connected to the other end of each of the inductors.

6. In magnetic recording apparatus for recording non-return-to-zero information and including a magnetic write head having a coil, a circuit for driving the coil comprising:

a flip-flop having first and second transistors, each having an emitter, collector and base electrode, third and fourth transistors each having a control electrode, the collector of the first transistor being directly connected to the control electrode of the third transistor, the collector of the second transistor being directly connected to the control electrode of the fourth transistor, first and second impedance elements, a first voltage source, the first voltage source being serially connected with the first impedance element and the third transistor and being serially connected with the second impedance element and the fourth transistor, the coil being coupled to the junctions of the first impedance element with the third transistor and the second impedance element with the fourth transistor, first and second inductors, a source of relatively fixed potential including a voltage divider, each of the inductors being connected between one of the control electrodes and the source of potential, whereby the flow of current through the inductors is maintained whenever the flip-flop changes state to speed up the switching of the flip-flop and the switching of the drive transistors from the conducting to the non-conducting state, and means for impressing trigger pulses alternately at the base electrodes of the first and second transistors for switching the flip-flop.

7. A circuit for driving a magnetic write head having a coil to record non-return-to-zero information on a magnetic medium movable with respect to the head, said circuit comprising:

a transistor flip-flop having first and second transistors, each having emitter, collector and base electrodes, third and fourth drive transistors, each having emitter, collector and base electrodes, the collector of the first transistor being directly connected to the base of the third transistor to provide a first junction, the collector of the second transistor being directly connected to the base of the fourth transistor to provide a second junction, a source of voltage, a first and second resistor, means connecting the source in series with the first resistor and the emitter and collector electrodes of the third transistor and connecting the source in series with the second resistor and the emitter and collector electrodes of the fourth transistor, the coil being connected between the junction of the first resistor and the third transistor and the junction of the second resistor and the fourth transistor, whereby the direction of current flow through the coil reverses when one of the drive transistors becomes conducting while the other one is cut off, first and second inductors, one end of each of the inductors being directly connected to one of the first and second junctions, whereby the flow of current through the inductors is maintained upon the flip-flop changing state to speed up the switching of the flip-flop and to rapidly reverse the direction of current flow through the coil, means for applying a set pulse to the base electrode of the first transistor, and means for applying a reset pulse to the base electrode of the second transistor.

8. A circuit as defined in claim 7 wherein the means for applying a set pulse includes a set transistor coupled to the base electrode of the first transistor, means for normally rendering the set transistor nonconducting and for rendering it conducting in response to a set pulse, and means for applying a reset pulse includes a reset transistor coupled to the base electrode of the second transistor, and means for normally rendering the reset transistor non-conducting and for rendering it conducting in response to a set pulse.

References Cited by the Examiner

UNITED STATES PATENTS

| | | | |
|---|---|---|---|
| 2,673,936 | 3/1954 | Harris | 307—88.5 |
| 2,838,675 | 6/1958 | Wanlass | 340—174.1 |

| | | | |
|---|---|---|---|
| 2,996,349 | 8/1961 | Mauch | 346—74 |
| 3,034,107 | 5/1962 | Knowles | 307—88.5 X |
| 3,125,759 | 3/1964 | Klein | 340—174.1 |

BERNARD KONICK, *Primary Examiner.*

IRVING SRAGOW, *Examiner.*

R. M. JENNINGS, P. F. ROTH, *Assistant Examiners.*